(12) United States Patent
Zhi et al.

(10) Patent No.: US 10,178,013 B2
(45) Date of Patent: Jan. 8, 2019

(54) FRAME AGGREGATION METHOD AND ELECTRONIC DEVICE

(71) Applicant: XI'AN ZHONGXING NEW SOFTWARE CO., LTD., Xi'An, Shaanxi Province (CN)

(72) Inventors: Zhou Zhi, Xi'An (CN); Ning Lv, Xi'An (CN); Zhong Yu, Xi'An (CN); Chen Lu, Xi'An (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/315,722

(22) PCT Filed: Nov. 10, 2014

(86) PCT No.: PCT/CN2014/090728
§ 371 (c)(1),
(2) Date: Dec. 1, 2016

(87) PCT Pub. No.: WO2015/184733
PCT Pub. Date: Dec. 10, 2015

(65) Prior Publication Data
US 2017/0093680 A1 Mar. 30, 2017

(30) Foreign Application Priority Data
Jun. 3, 2014 (CN) .......................... 2014 1 0243093

(51) Int. Cl.
*H04L 12/26* (2006.01)
*H04L 5/00* (2006.01)
*H04W 24/08* (2009.01)

(52) U.S. Cl.
CPC ............ *H04L 43/16* (2013.01); *H04L 5/0053* (2013.01); *H04L 43/08* (2013.01); *H04L 43/0823* (2013.01); *H04W 24/08* (2013.01)

(58) Field of Classification Search
None
See application file for complete search history.

(56) References Cited

U.S. PATENT DOCUMENTS

| 8,724,652 B2* | 5/2014 | Hong | H04W 16/14 370/462 |
| 2005/0095569 A1* | 5/2005 | Franklin | G09B 5/00 434/350 |

(Continued)

FOREIGN PATENT DOCUMENTS

| CN | 101662546 A | 3/2010 |
| CN | 102355324 A | 2/2012 |

(Continued)

*Primary Examiner* — Bunjob Jaroenchonwanit
(74) *Attorney, Agent, or Firm* — Ling Wu; Stephen Yang; Ling and Yang Intellectual Property

(57) ABSTRACT

The present document discloses a frame aggregation method and an electronic device. Herein, the method includes: acquiring state information of a wireless channel; acquiring state information of an operator according to a preset sate parameter; and performing calculation according to the state information of the wireless channel and the state information of the operator to obtain a calculation result, and performing frame aggregation when the calculation result meets a first condition.

11 Claims, 3 Drawing Sheets

(56) References Cited

U.S. PATENT DOCUMENTS

| | | | | |
|---|---|---|---|---|
| 2006/0018268 A1* | 1/2006 | Kakani | | H04W 28/06 370/278 |
| 2007/0211625 A1* | 9/2007 | Liu | | H04L 47/10 370/229 |
| 2007/0280130 A1* | 12/2007 | Matsuo | | H04W 28/22 370/252 |
| 2008/0192686 A1* | 8/2008 | Cho | | H04W 16/14 370/329 |
| 2009/0046681 A1* | 2/2009 | Kalogridis | | H04W 72/1289 370/338 |
| 2009/0201898 A1* | 8/2009 | Gong | | H04L 1/0007 370/338 |
| 2010/0046540 A1* | 2/2010 | Nishibayashi | | H04L 1/1614 370/445 |
| 2011/0019557 A1 | 1/2011 | Hassan et al. | | |
| 2011/0150463 A1* | 6/2011 | Zhou | | H04L 12/2865 398/25 |
| 2011/0225311 A1* | 9/2011 | Liu | | H04L 45/125 709/231 |
| 2012/0069828 A1* | 3/2012 | Taki | | H04W 88/16 370/338 |
| 2012/0128043 A1* | 5/2012 | Hong | | H04W 16/14 375/219 |
| 2012/0188233 A1* | 7/2012 | Shuster | | G06T 15/20 345/419 |
| 2013/0024183 A1* | 1/2013 | Cardie | | G06F 17/30719 704/8 |
| 2013/0051271 A1* | 2/2013 | Cao | | H04L 41/5067 370/252 |
| 2014/0140209 A1* | 5/2014 | Shihada | | H04L 43/0864 370/230 |
| 2014/0146736 A1* | 5/2014 | Kim | | H04W 4/08 370/312 |
| 2014/0146764 A1* | 5/2014 | Kim | | H04W 74/006 370/329 |
| 2014/0327579 A1* | 11/2014 | Hart | | G01S 3/48 342/374 |
| 2014/0362091 A1* | 12/2014 | Bouaziz | | G06T 13/40 345/473 |
| 2016/0360442 A1* | 12/2016 | Stacey | | H04W 28/065 |
| 2017/0280460 A1* | 9/2017 | Emmanuel | | H04L 1/0003 |
| 2017/0324518 A1* | 11/2017 | Meng | | H04L 1/08 |

FOREIGN PATENT DOCUMENTS

| | | |
|---|---|---|
| CN | 102668490 A | 9/2012 |
| CN | 103348730 A | 10/2013 |
| KR | 20140001930 A | 1/2014 |

* cited by examiner

FRAME AGGREGATION METHOD AND ELECTRONIC DEVICE

TECHNICAL FIELD

The present document relates to the control technology of the electronic devices in the mobile communication field, and in particular to a frame aggregation method and an electronic device.

BACKGROUND OF THE RELATED ART

At present, whether to use the frame aggregation technology and a method for determining the frame length during the frame aggregation is judged usually based on the quality of the wireless channel. When the channel quality is good, the frame aggregation technology is used, which can effectively improve the throughput of the local area network; when the channel quality is poor, the frame aggregation technology is not used or only the shorter aggregation frame is used, which can reduce the impact of retransmission on the system throughput.

However, the above judgment method does not distinguish the characteristics of the devices using the frame aggregation technology. That is, the above judgment method does not distinguish whether the devices are handheld wireless terminals or wireless access devices without user participation. Thus, the accuracy and the effectiveness of acquiring the channel state information cannot be guaranteed, which can affect the accuracy of judging whether to use the frame aggregation technology.

SUMMARY

In order to solve the above technical problem, the objective of the present document is to provide a frame aggregation method and an electronic device.

The embodiment of the present document provides a frame aggregation method, including:

acquiring state information of a wireless channel;

acquiring state information of an operator according to a preset sate parameter;

performing calculation according to the state information of the wireless channel and the state information of the operator to obtain a calculation result, and performing frame aggregation when the calculation result meets a first condition.

In the above scheme, the state information of the wireless channel includes at least one of the following: a data error rate, a packet loss rate, a number of retransmission and a wireless signal strength.

In the above scheme, the state information of the operator is a mood state of the operator or an operation environment state of the operator.

In the above scheme, the above method further includes: setting a state parameter corresponding to the operator.

In the above scheme, the state parameter corresponding to the operator includes: a model; and an establishment method of the model includes: collecting a sensing parameter in a duration with a specified length, converting the sensing parameter to change information of N states corresponding to the operator, taking the change information of the N states as an input parameter for training, and taking a state corresponding to the operator as an output result to train the model.

In the above scheme, the change information of the N states comprises one or more of the following:

change information of an expression symbol, change information of a voice, location change information, motion change information and temperature change information.

In the above scheme, said meeting the first condition includes: meeting the first condition when the calculation result reaches a preset threshold value.

The embodiment of the present document further provides an electronic device, including:

an information acquisition module, configured to acquire state information of a wireless channel; and acquire state information of an operator according to a preset sate parameter;

a decision module, configured to perform calculation according to the state information of the wireless channel and the state information of the operator to obtain a calculation result; and an adjustment module is configured to perform frame aggregation when the calculation result meets a first condition.

In the above scheme, the state information of the wireless channel includes at least one of the following: a data error rate, a packet loss rate, a number of retransmission and a wireless signal strength.

In the above scheme, the state information of the operator is a mood state of the operator or an operation environment state of the operator.

In the above scheme, the information acquisition module is further configured to set a state parameter corresponding to the operator.

In the above scheme, the information acquisition module is further configured to take a preset model as the state parameter corresponding to the operator.

an establishment method of the model includes: collecting a sensing parameter in a duration with a specified length through a sensor, converting the sensing parameter to change information of N states corresponding to the operator, taking the change information of the N states as an input parameter for training, and taking a state corresponding to the operator as an output result to train the model.

In the above scheme, the change information of the N states comprises one or more of the following:

change information of an expression symbol, change information of a voice, location change information, motion change information and temperature change information.

In the above scheme, the decision module is configured to meet the first condition when the calculation result reaches a preset threshold value.

A computer readable storage medium storing computer executable instructions, wherein, the computer executable instructions are used for implementing the frame aggregation method.

The frame aggregation method and electronic device provided by the embodiments of the present document can perform calculate according to the state of the wireless channel and the state of the operator, and determine whether to perform the frame aggregation according to the calculation result. Therefore, whether the frame aggregation is required to be performed can be accurately judged, which can further guarantee the frame transmission quality of the electronic device.

SPECIFIC EMBODIMENTS

The present document is further described in details in combination with the accompanying drawings and specific embodiments.

Embodiment One

Figure 1:
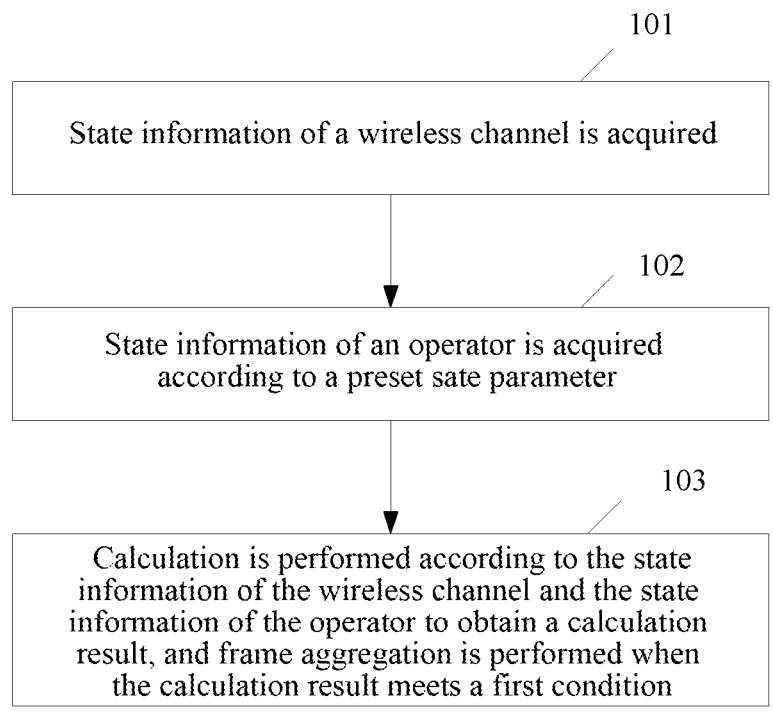
FIG. 1 is a first flow chart of a frame aggregation method provided by the present document.

The frame aggregation method provided by an embodiment of the present document includes the following steps as shown in FIG. 1.

In step 101, state information of a wireless channel is acquired.

In step 102, state information of an operator is acquired according to a preset sate parameter.

In step 103, calculation is performed according to the state information of the wireless channel and the state information of the operator to obtain a calculation result, and frame aggregation is performed when the calculation result meets a first condition.

Alternatively, the above steps 101 and 102 are executed in any sequence. They may be executed at the same time, and the step 102 may be firstly executed and then the step 101 may be executed. The embodiment does not limit the execution sequence of the steps 101 and 102.

Herein, the state information of the wireless channel includes at least one of the following: a data error rate, a packet loss rate, a number of retransmission and a wireless signal strength.

For information such as the data error rate, the packet loss rate and the number of retransmission and so on, when the value of the information is greater than the preset threshold value, it indicates that the state of the channel to which the information belongs is poor. Otherwise, it indicates that the state of the channel to which the information belongs is good. For the wireless signal strength, when its value is greater than the preset threshold value, it indicates that the state of the channel to which the wireless signal strength belongs is good. Otherwise, it indicates that the state of the channel to which the wireless signal strength belongs is poor.

For example, when the states are divided into two levels, that is, good and poor; the good may be represented by "1", and the poor may be represented by "0". Or, when the states are divided into three levels, that is, good, medium and poor, the good may be represented by "11", the medium is represented by "01", and the poor is represented by "00".

The acquisition of the state of the wireless channel may include: for a closed loop transmission, even if there is a situation such as delay and error and so on, the sending end may acquire the state information of the wireless channel. For an open loop transmission, the sending end cannot obtain the information, such as, the data error rate, the packet loss rate, and the wireless signal strength and so on, through a feedback of a receiving end. However, the channel state may be inferred by using a heuristic algorithm through the information such as the number of retransmission, etc. The channel state is the "poor" state by default when the sending end is unable to obtain any channel state information.

The state information of the operator may be a mood state of the operator, or may be an operation environment state of the operator and so on. The state information of the operator also may be represented by using a corresponding identification similarly; for example, when the states are divided into two levels, that is, good and poor; the good may be represented by "1", and the poor may be represented by "0"; or, when the states are divided into three levels, that is, good, medium and poor, the good may be represented by "11", the medium may be represented by "01", and the poor may be represented by "00".

Alternatively, before executing the step 101, the method may further include: setting a state parameter corresponding to the operator.

The state parameter corresponding to the operator may include a model. A training method of the model may include that: it is to collect a sensing parameter in a duration with a specified length through a sensor, convert the sensing parameter to change information of N states corresponding to the operator, take the change information of the N states as input parameters for training, and take a state corresponding to the operator as an output result to train the model.

Herein, the sensor may include a compass, a camera, a gyroscope and optical sensor, a global positioning system GPS, a pressure sensor, a temperature sensor and an acceleration sensor, etc.

The change information of the N states may include: change information of an expression symbol, such as facial expression emotion recognition; change information of the voice, such as, speech emotion recognition, semantic emotion recognition, central nervous signal emotion recognition, signal emotion recognition for autonomic nervous signals, etc.; location change information, motion change information, and temperature change information, etc.

For example, the change information of the expression symbol may be obtained by collecting the expression symbol input by the user when the user uses various kinds of chat software; the voice may be acquired through collection by the microphone, and then the change information, such as, strength, frequency, etc., of the voice made by the user is analyzed; the location or motion, etc., may be obtained through the gyroscope, or the GPS, or the acceleration sensor, etc.; the temperature of the operator may be obtained through the temperature sensor, and then the temperature change information may be obtained through the analysis. Herein, the method for obtaining the corresponding information through various sensors belongs to the related art, which will not be repeated here.

Alternatively, the change information of the N states is taken as the input parameters for the training, which may only select the change information of one state; for example, for the typical parameter, a certain emotion may be obtained by using a single parameter; for example, the facial expression parameter is used to judge the emotion. When that parameter is not suitable, a method in which multiple parameters are combined may be used to judge the user emotion.

Here, taking the mood state of the operator as an example for illustration, after the mood relevant information of the user in a period of time is collected through the sensor, the mood relevant information may be quantized to the numerical value information which may be processed by the program (such as, 0, 1, or a discrete numerical value in a certain range), these information is taken as samples to generate a classification model (that is, user mood state model) by using a two-type classification method in the machine learning (such as, Bias classification method).

Through that model, a mood state recognition may be performed on the newly collected mood information of the user.

When the state information of the operator represents the emotion of the operator, that speech and expression will show different characteristics when the user has different mood changes. That is, the machine learning may identify the characteristic emotion of the user in a certain percentage through extracting the user characteristic data in a certain state and the machine learning and training. For one emotion of the user, such as, the anger emotion, the spectrum of the tone has its characteristic, and the expression has its characteristic, and their characteristics, as the characteristic values, are input into a classifier to achieve the emotion recognition in a certain degree.

The classifier is a machine learning program, and the essence of the classifier is a mathematical model. According to the different models, there are many kinds of branches, including: a Bayes classifier, a BP neural network classifier, a decision tree algorithm, a support vector machine SVM algorithm and so on. The formula may be:

Mood=$X$($X$1, $X$2 $Xn$)

X1, X2 . . . and Xn respectively represent the different physiological characteristics of the user, and may represent multiple emotion characteristic parameters, here including but not limited to the parameters herein and may also including other parameters. Different emotion characteristic parameters are used for comprehensive judgment to obtain the final emotion information of the user.

Said meeting the first condition includes: the first condition is met when the calculation result reaches a preset threshold value.

Herein, the calculation may use the formula:
ag_condition=channel_stat∪usr_mode. In the formula, the parameter ag_condition represents the aggregation condition, and its value is "1" and "0". The parameter channel_stat represents the state of the wireless channel, and the parameter usr_stat represents the state of the operator. When ag_condition=1, it represents the frame aggregation condition is met; and When ag_condition=0, it represents the frame aggregation condition is not met.

Embodiment Two

Figure 3:
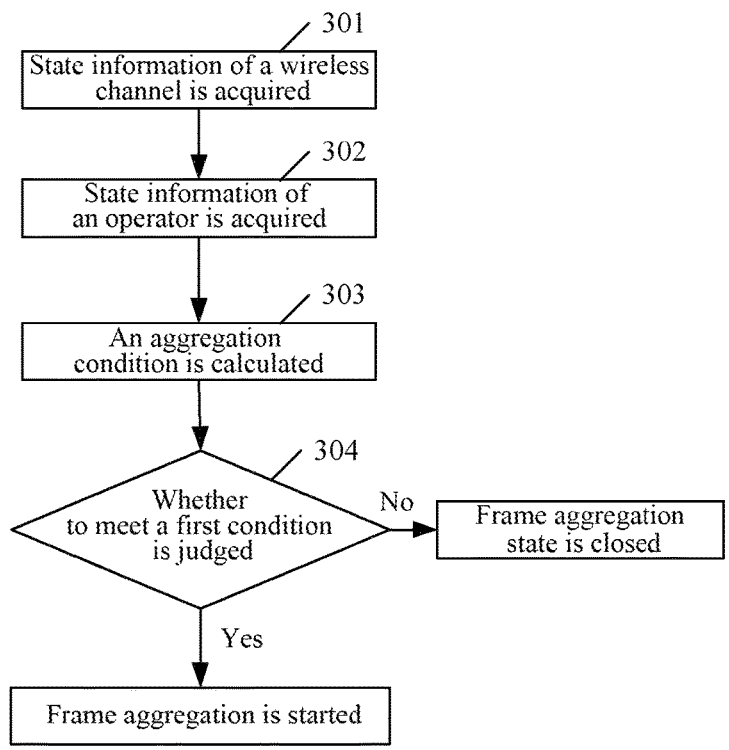
FIG. 3 is a second flow chart of a frame aggregation method provided by the present document.

One implementation mode of the present document is illustrated hereinafter. As shown in FIG. 3, the specific process is as follows.

In step 301, a wireless mobile terminal collects state information of the wireless channel.

In step 302, the wireless mobile terminal uses a sensor to collect different state information of the operator, and the state information of the operator is obtained through the calculation by using the state parameters after the collected information is processed.

In step 303, the frame aggregation condition is calculated according to the state information of the wireless channel and the state information of the operator.

In step 304, whether to meet a first condition is judged; if the calculated result is "1", then it is represented the first condition is met, and the frame aggregation is performed; otherwise, no operation is made.

Figure 4:
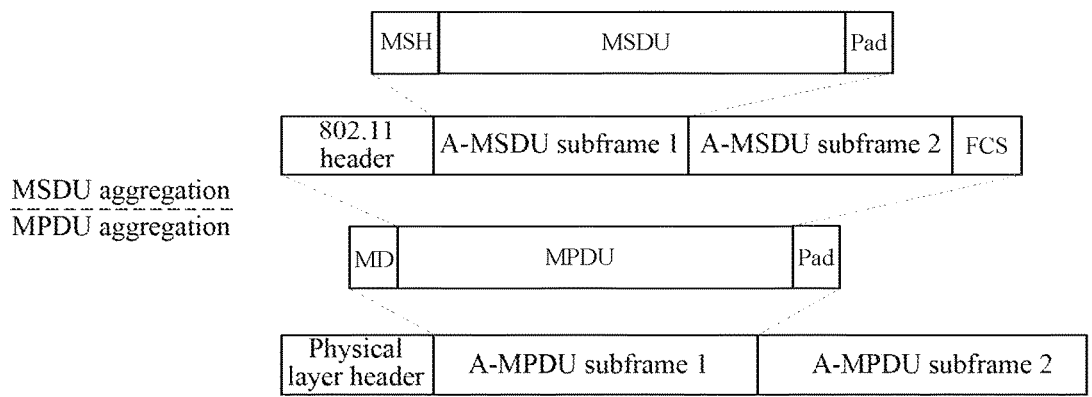
FIG. 4 is a composition structure diagram of a frame in the frame aggregation technology.

The frame aggregation, as shown in FIG. 4, includes A-MSDU and A-MPDU. The A-MSDU technology is applied at the top of the MAC layer, and it aggregates multiple MSDUs as one MPDU. The A-MPDU technology is applied at the bottom of the MAC layer, and it aggregates multiple MPDUs as one PSDU. Herein, the MPDU may include the aggregated A-MSDUs.

Embodiment Three

Figure 5:
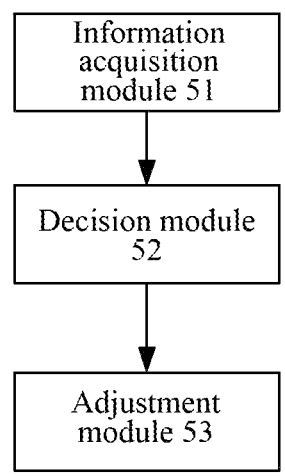
FIG. 5 is a composition structure diagram of an electronic device provided by the present document.

An electronic device provided by an embodiment of the present document, as shown in FIG. 5, includes:

an information acquisition module 51, configured to acquire state information of a wireless channel; and acquire state information of an operator according to a preset sate parameter;

a decision module 52, configured to perform calculation according to the state information of the wireless channel and the state information of the operator to obtain a calculation result; and an adjustment module 53, configured to perform frame aggregation when the calculation result meets a first condition.

Herein, the state information of the wireless channel includes at least one of the following: a data error rate, a packet loss rate, a number of retransmission and a wireless signal strength.

For information such as the data error rate, the packet loss rate and the number of retransmission and so on, when the value of the information is greater than the preset threshold value, it indicates that the state of the channel to which the information belongs is poor; otherwise, it indicates that the state of the channel to which the information belongs is good. For the wireless signal strength, when its value is greater than the preset threshold value, it indicates that the state of the channel to which the wireless signal strength belongs is good; otherwise, it indicates that the state of the channel to which the wireless signal strength belongs is poor.

For example, when the states are divided into two levels, that is, good and poor; the good may be represented by "1", and the poor may be represented by "0". Or, when the states are divided into three levels, that is, good, medium and poor, the good may be represented by "11", the medium may be represented by "01", and the poor may be represented by "00".

The information acquisition module 51 is configured as that, for a closed loop transmission, even if there is a situation such as delay and error and so on, the sending end may obtain the state information of the wireless channel. For an open loop transmission, the sending end cannot obtain the information, such as, the data error rate, the packet loss rate, and the wireless signal strength and so on, through a feedback of a receiving end. However, the channel state may be inferred by using a heuristic algorithm through the information such as the number of retransmission, etc. The channel state is the "poor" state by default when the sending end is unable to obtain any channel state information.

The state information of the operator may be a mood state of the operator, or may be an operation environment state of the operator and so on. The state information of the operator also may be represented by using a corresponding identification similarly; for example, when the states are divided into two levels, that is, good and poor; the good may be represented by "1", and the poor may be represented by "0"; or, when the states are divided into three levels, that is, good, medium and poor, the good may be represented by "11", the medium may be represented by "01", and the poor may be represented by "00".

The information acquisition module 51 may be used to set a state parameter corresponding to the operator.

The state parameter corresponding to the operator may include a model. A training method of the model may include: it is to collect a sensing parameter in a duration with a specified length through a sensor, convert the sensing parameter to change information of N states corresponding to the operator, take the change information of the N states as input parameters for training, and take a state corresponding to the operator as an output result to train the model.

Figure 2:
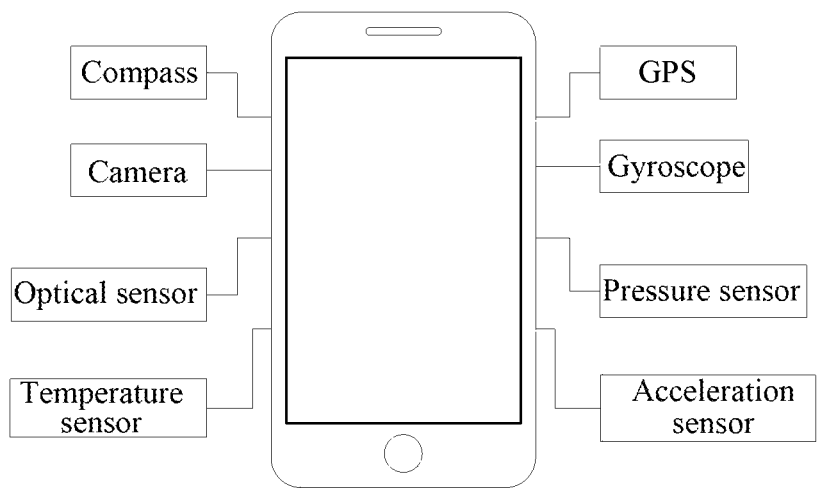
FIG. 2 is a diagram of multiple kinds of sensors which are provided with by an electronic device.

Herein, the sensor may include a camera, a gyroscope, and a light sensor, etc., as shown in FIG. 2. The change information of the N states may include: change information of an expression symbol, voice information, location change information, motion change information, and so on. For example, the change information of the expression symbol may be acquired by collecting the expression symbol input by the user when the user uses various kinds of chat software; the voice may be acquired through collection by the microphone, and then the information, such as, strength, speed, etc., of the voice made by the user is analyzed; the location or action, etc., may be acquired by through the gyroscope. For example, 1. facial expression emotion recognition, 2. speech emotion recognition, 3. semantic emotion recognition, 4. central nervous signal emotion recognition, and 5. signal emotion recognition for autonomic nervous signals. For a typical parameter, a certain emotion may be acquired by using a single parameter; for example, the facial expression parameter is used to judge the emotion. When that parameter is not suitable, a method in which multiple parameters are combined is used to judge the user emotion.

After the mood relevant information of the user is collected in a period of time through the sensor, the mood relevant information is quantized to the numerical value information which may be processed by the program (such as, 0, 1, or a discrete numerical value in a certain range), these information is taken as samples to generate a classification model (that is, user mood state model) by using a two-type classification method in the machine learning (such as, Bias classification method). Through that model, a mood state recognition may be performed on the newly collected mood information of the user.

For example, when the state information of the operator represents the emotion of the operator, speech and expression will show different characteristics when the user has different mood changes. That is, the machine learning may identify the characteristic emotion of the user in a certain percentage through extracting the user characteristic data in a certain state and the machine learning and training. For one emotion of the user, for example, the anger emotion, the spectrum of the tone has its characteristic, and the expression has its characteristics, and their characteristics, as the characteristic values, are input into a classifier to achieve the emotion recognition in a certain degree.

The classifier is a machine learning program, and the essence of the classifier is a mathematical model. According to the different models, there are many kinds of branches, including: a Bayes classifier, a BP neural network classifier, a decision tree algorithm, a support vector machine SVM algorithm and so on. The formula may be:

$$\text{Mood}=X(X1, X2Xn)$$

X1, X2. . . and Xn respectively represent the different physiological characteristics of the user, and may represent multiple emotion characteristic parameters, here including but not limited to the parameters herein and may also including other parameters. Different emotion characteristic parameters are used for comprehensive judgment to obtain the final emotion information of the user.

Said meeting the first condition includes: the first condition is met when the calculation result reaches a preset threshold value.

Herein, the calculation may use the formula:

ag condition=channel stat∪usr_mode. In the formula, the parameter ag_condition represents the aggregation condition, and its value is "1" and "0". The parameter channel_stat represents the state of the wireless channel, and the parameter usr_stat represents the state of the operator. When ag_condition=1, it represents the frame aggregation condition is met; and When ag_condition=0, it represents the frame aggregation condition is not met.

Those skilled in the art should understand that the embodiment of the present document may be provided as a method, system, or computer program product. Therefore, the present document may use the forms of hardware embodiment, software embodiment, or embodiment combining with software and hardware. Moreover, the present document may use the form of computer program products executed on one or more computer available storage mediums (including but not limited to the disk storage and optical memory, etc.) which contain the computer usable program code.

The present document is described referring to a flow chart and/or a block diagram of a method, a device (system), and a computer program product. It should be understood that the computer program instructions can realize each flow and/or block in the flow chart and/or block diagram, and a combination of a flow and/or block in the flow chart and/or block diagram. These computer program instructions can be provided to a general computer, special computer, embedded processor or processors of other programming data processing devices to produce a machine, so that an apparatus used for realizing the function specified in one flow or multiple flows of the flow chart and/or one block or multiple blocks in the block diagram is generated through the instructions executed by the computer or the processors of other programming data processing devices.

The computer program instructions may also be stored in the computer readable memory which can lead the computer or other programmable data processing devices to work in a specific way, so that the instructions stored in the computer readable memory generate a manufacturing product including the instruction device, and the instruction device is used to realize the function specified in one flow or multiple flows of the flow chart and/or one block or multiple blocks in the block diagram.

The computer program instructions may also be loaded to the computer or other programmable data processing devices, so that a series of operating steps are executed on the computer or other computer programming devices to generate the processing implemented by the computer; thus the instructions executed on the computer or other programmable devices provide steps for realizing the function specified in one flow or multiple flows of the flow chart and/or one block or multiple blocks in the block diagram.

The above description is only preferred embodiments of the present document, and is not used to limit the protection scope of the present document.

INDUSTRIAL APPLICABILITY

The present document discloses a frame aggregation method and an electronic device, herein, the method includes: state information of a radio channel is acquired; state information of an operator is acquired according to a preset sate parameter; and frame aggregation is performed according to the state information of the wireless channel and the state information of the operator. Therefore, whether the frame aggregation is required to be performed can be accurately judged, which can further guarantee the frame transmission quality of the electronic device.

What we claim is:

1. A frame aggregation method, comprising:
   acquiring state information of a wireless channel;
   acquiring state information of an operator according to a preset sate parameter;
   performing calculation according to the state information of the wireless channel and the state information of the operator to obtain a calculation result, and performing frame aggregation when the calculation result meets a first condition;
   wherein the method further comprises: setting a state parameter corresponding to the operator;
   wherein the state parameter corresponding to the operator comprises: a model; and an establishment method of the model comprises: collecting a sensing parameter in a duration with a specified length, converting the sensing parameter to change information of N states corresponding to the operator, taking the change information of the N states as an input parameter for training, taking a state corresponding to the operator as an output result to train the model.

2. The method according to claim 1, wherein, the state information of the wireless channel comprises at least one of the following: a data error rate, a packet loss rate, a number of retransmission and a wireless signal strength.

3. The method according to claim 1, wherein, the state information of the operator is a mood state of the operator or an operation environment state of the operator.

4. The method according to claim 1, wherein, the change information of the N states comprises one or more of the following:
   change information of an expression symbol, change information of a voice, location change information, motion change information and temperature change information.

5. The method according to claim 1, wherein, said meeting a first condition comprises: meeting the first condition when the calculation result reaches a preset threshold value.

6. An electronic device, comprising:
   a non-transitory computer readable storage medium;
   a processor coupled to the non-transitory computer readable storage medium, executing:
   an information acquisition module to acquire state information of a wireless channel; and acquire state information of an operator according to a preset sate parameter;
   a decision module to perform calculation according to the state information of the wireless channel and the state information of the operator to obtain a calculation result; and
   an adjustment module to perform frame aggregation when the calculation result meets a first condition;
   wherein the information acquisition module sets a state parameter corresponding to the operator;
   wherein the information acquisition module takes a preset model as the state parameter corresponding to the operator; and an establishment method of the model comprises: collecting a sensing parameter in a duration with a specified length through a sensor, converting the sensing parameter to change information of N states corresponding to the operator, taking the change information of the N states as an input parameter for training, and taking a state corresponding to the operator as an output result to train the model.

7. The electronic device according to claim 6, wherein, the state information of the wireless channel comprises at least one of the following: a data error rate, a packet loss rate, a number of retransmission and a wireless signal strength.

8. The electronic device according to claim 6, wherein, the state information of the operator is a mood state of the operator or an operation environment state of the operator.

9. The electronic device according to claim 6, wherein, the change information of the N states comprises one or more of the following:
   change information of an expression symbol, change information of a voice, location change information, motion change information and temperature change information.

10. The electronic device according to claim 6, wherein, the decision module is configured to meet the first condition when the calculation result reaches a preset threshold value.

11. A non-transitory computer readable storage medium storing computer executable instructions, wherein, the computer executable instructions are used for implementing the frame aggregation method according to claim 1.

* * * * *